(12) United States Patent
Ozu et al.

(10) Patent No.: US 12,110,890 B2
(45) Date of Patent: Oct. 8, 2024

(54) ROTARY COMPRESSOR AND REFRIGERATION CYCLE DEVICE

(71) Applicant: GUANGDONG MEIZHI COMPRESSOR CO., LTD., Guangdong (CN)

(72) Inventors: Masao Ozu, Guangdong (CN); Bin Gao, Guangdong (CN); Ling Wang, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 468 days.

(21) Appl. No.: 17/485,775

(22) Filed: Sep. 27, 2021

(65) Prior Publication Data

US 2022/0010796 A1    Jan. 13, 2022

Related U.S. Application Data

(63) Continuation of application No. PCT/CN2019/115399, filed on Nov. 4, 2019.

(30) Foreign Application Priority Data

Aug. 23, 2019 (CN) .......................... 201910785885.3
Aug. 23, 2019 (CN) .......................... 201910785989.4

(51) Int. Cl.
*F25B 49/02* (2006.01)
*F04C 18/356* (2006.01)
*F04C 28/26* (2006.01)

(52) U.S. Cl.
CPC ............ *F04C 18/356* (2013.01); *F04C 28/26* (2013.01); *F25B 49/02* (2013.01); *F25B 2500/18* (2013.01);

(Continued)

(58) Field of Classification Search
CPC .......................... F25B 2500/26; F25B 2500/18
See application file for complete search history.

(56) References Cited

U.S. PATENT DOCUMENTS 4,295,342 A * 10/1981 Parro .................. F28D 15/0266
165/909
4,393,663 A * 7/1983 Grunes ............... F28D 15/0266
62/119

(Continued)

FOREIGN PATENT DOCUMENTS

CN     202100466 U    1/2012
CN     103511261 A    1/2014

(Continued)

OTHER PUBLICATIONS

Machine translation of Hwang et al. "Capacity variable device for rotary compressor"; 2005; Espacenet, 20050098184, all (Year: 2005).*

(Continued)

*Primary Examiner* — Filip Zec
(74) *Attorney, Agent, or Firm* — Scully, Scott, Murphy & Presser, P.C.

(57) ABSTRACT

A rotary compressor and a refrigeration cycle device are provided. The rotary compressor includes a housing, an exhaust pipe and a suction pipe. The housing accommodates a motor and a compression mechanism. The exhaust pipe is communicated with a high-pressure side of the refrigeration cycle device and coupled to the housing. The suction pipe is communicated with a low-pressure side of the refrigeration cycle device and coupled to the compression mechanism. The compression mechanism has a bypass device. When the motor is stopped, gas of the housing flows into the suction pipe or a low-pressure circuit communicated with the suction pipe.

18 Claims, 10 Drawing Sheets

(52) U.S. Cl.
CPC ... *F25B 2500/26* (2013.01); *F25B 2600/0261* (2013.01)

(56) References Cited

U.S. PATENT DOCUMENTS

| | | | | |
|---|---|---|---|---|
| 4,815,298 | A * | 3/1989 | Van Steenburgh, Jr. | ..................... F17D 3/14 62/509 |
| 5,423,180 | A * | 6/1995 | Nobue | ..................... F01N 3/032 60/275 |
| 6,116,035 | A * | 9/2000 | Tanaka | ..................... F25B 1/00 62/DIG. 22 |
| 6,557,361 | B1 * | 5/2003 | Howard | ..................... F25B 7/00 62/228.3 |
| 9,010,136 | B2 * | 4/2015 | Meister | ..................... F25B 5/00 62/185 |
| 9,033,689 | B2 * | 5/2015 | Ginies | ..................... F04C 18/0215 418/55.6 |
| 10,301,940 | B2 * | 5/2019 | Tanaka | ..................... F01C 21/18 |
| 2005/0129557 | A1 * | 6/2005 | Makino | ..................... F04C 23/008 418/55.6 |

FOREIGN PATENT DOCUMENTS

| | | |
|---|---|---|
| CN | 104033389 A | 9/2014 |
| CN | 104454528 A | 3/2015 |
| CN | 108626121 A | 10/2018 |
| JP | S63140885 A | 6/1988 |
| JP | 2006105040 A | 4/2006 |
| KR | 20050098184 A | 10/2005 |
| KR | 100608866 B1 | 8/2006 |
| KR | 100620042 B1 | 9/2006 |
| WO | WO-2011055444 A1 * | 5/2011 ............. F04B 25/00 |

OTHER PUBLICATIONS

Second Office Action dated Dec. 13, 2016 received in Chinese Patent Application No. CN 201910785885.3 together with an English language translation.
International Search Report dated May 21, 2020 issued in PCT/CN2019/115399.
Chinese OA dated Jun. 16, 2021 issued in CN 201910785885.3.
Chinese OA dated Jun. 17, 2021 issued in CN 201910785989.4.
Second Office Action dated Nov. 24, 2021 received in Chinese Patent Application No. CN 201910785989.4 together with an English language translation.

* cited by examiner

ROTARY COMPRESSOR AND REFRIGERATION CYCLE DEVICE

CROSS-REFERENCE TO RELATED APPLICATIONS

The present application is a continuation application of PCT International Application No. PCT/CN2019/115399, filed on Nov. 4, 2019, which claims priority to and benefit of Chinese Patent Application No. 201910785989.4 entitled "Rotary Compressor and Refrigeration Cycle Device" filed on Aug. 23, 2019, and Chinese Patent Application No. 201910785885.3 entitled "Rotary Compressor and Refrigeration Cycle Device" filed on Aug. 23, 2019, the entire content of which is incorporated herein by reference for all purposes. No new matter has been introduced.

FIELD

The application relates to the field of compressors, and more particular to a rotary compressor and a refrigeration cycle device.

BACKGROUND

Compared with a variable-frequency rotary compressor capable of freely changing the rotating speed of a motor, the rotary compressor with the rotating speed of the motor fixed at 50 Hz or 60 Hz needs to be repeatedly started and stopped frequently due to the room temperature control of an air conditioner. However, the problem of the rotary compressor in which the internal pressure of the hermetic housing is high pressure is that: if the housing pressure or the exhaust pressure is not equal to the suction pressure of the compression chamber, the motor cannot be started. If, as before, the restarting time after the compressor is stopped is about 3 minutes long, and it takes time for the housing pressure of the restarted compressor to change from low pressure to high pressure, not only is the comfort level provided by the air conditioner non-satisfactory, but also the APF of the air conditioner will degrade.

SUMMARY

The present application at least solves one of the above-described technical problems in the related art. To this end, the present application proposes a rotary compressor to shorten the restarting time of the compressor.

The present application also proposes a refrigeration cycle device having the rotary compressor.

According to embodiments of the present application, a rotary compressor includes a housing, an exhaust pipe communicated with a high-pressure side of a refrigeration cycle device and a suction pipe communicated with a low-pressure side of the refrigeration cycle device. The housing accommodates a motor and a compression mechanism. The exhaust pipe is coupled to the housing, the suction pipe is coupled to the compression mechanism, and the compression mechanism has a bypass device. When the motor is stopped, gas of the housing flows to the suction pipe or a low-pressure circuit communicated with the suction pipe.

According to some embodiments of the present application, the bypass device includes at least: a bypass hole communicated with the housing, a bypass valve opening and closing the bypass hole due to pressure difference between the housing and the suction pipe, and a spring enabling the bypass valve to move in a direction of opening the bypass hole.

Further, a side of the bypass hole is coupled to an inside of an exhaust muffling chamber of the compression mechanism, and the other side of the bypass hole is coupled to the suction pipe or a low-pressure circuit communicated with the suction pipe.

According to some embodiments of the present application, one of a main shaft plate and an auxiliary shaft plate, which are coupled to two open side surfaces of a cylinder compression chamber in the compression mechanism, is equipped with the bypass device.

According to some embodiments of the present application, a check valve is provided between the high-pressure side of the refrigeration cycle device and the exhaust pipe for preventing high-pressure gas on the high-pressure side of the refrigeration cycle device from reversely flowing into the exhaust pipe when the motor is stopped.

For example, when the pressure difference between the housing and the suction pipe is less than a preset value, the bypass valve opens the bypass hole; when the pressure difference between the housing and the suction pipe is larger than the preset value, the bypass valve closes the bypass hole.

According to some embodiments of the present application, the compression mechanism includes: a cylinder, a main bearing, and an auxiliary bearing. The main bearing is located at a first end of the cylinder, the auxiliary bearing is located at a second end of the cylinder, and each of a main shaft plate of the main bearing and an auxiliary shaft plate of the auxiliary bearing is provided with the bypass device.

Further, a side of the main bearing facing away from the cylinder is provided with a main muffler, a side of the auxiliary bearing facing away from the cylinder is provided with an auxiliary muffler, the compression mechanism has a through-hole communicated with the main muffler and the auxiliary muffler, a first end of the bypass hole of the bypass device is communicated with a muffling chamber of a corresponding muffler, and a second end of the bypass hole is communicated with the suction pipe.

According to some embodiments of the present application, the compression mechanism includes: a cylinder, a main bearing, and an auxiliary bearing. The main bearing is located at a first end of the cylinder, the auxiliary bearing is located at a second end of the cylinder, and the bypass device is provided on an outer circumferential surface of the cylinder.

According to some embodiments of the present application, the bypass device is a pressure equalizing device having a bypass hole communicating the inside of the housing with the suction pipe;

the rotary compressor further includes: a liquid reservoir. A first end of the liquid reservoir is coupled to the suction pipe, a second end of the liquid reservoir is coupled to a first check valve device, and when the motor is stopped, the bypass hole of the pressure equalizing device is opened, the first check valve device is closed, and gas in the housing flows into the suction pipe or the liquid reservoir.

Alternatively, the first check valve device is a one-way valve or an electromagnetic on-off valve.

According to some embodiments of the present application, the exhaust pipe is provided with a second check valve device, and the second check valve device is closed when the pressure inside the housing is reduced.

Alternatively, the second check valve device is a one-way valve or an electromagnetic on-off valve.

According to some embodiments of the present application, the pressure equalizing device includes: a bypass valve for opening or closing the bypass hole, and a spring expanding and contracting by using pressure difference between the housing and the liquid reservoir.

Further, a high-pressure side open end of the bypass hole is located in a muffler of the compression mechanism.

For example, the compression mechanism includes: a cylinder, a main bearing, and an auxiliary bearing. The main bearing is located at a first end of the cylinder, the auxiliary bearing is located at a second end of the cylinder, a compression chamber is defined in the cylinder, and the suction pipe is communicated with the compression chamber.

Further, the muffler has a muffler exhaust hole communicated with the inside of the housing.

According to some embodiments of the present application, the bypass valve selectively communicates the bypass hole with the suction pipe using the pressure difference between the housing and the liquid reservoir, and the spring moves the bypass valve in a direction of opening the bypass hole.

With the rotary compressor according to embodiments of the present application, the restarting time of the compressor can be greatly shortened such that the change of the temperature of the air conditioner is small, and the APF can be improved.

A refrigeration cycle device according to embodiments of another aspect of the present application includes the rotary compressor as described above.

The rotary compressor has the same advantages as the rotary compressor described above relative to the related art, and thus will not be described in detail herein.

Additional aspects and advantages of the present application will be set forth in part in the description which follows, and part of additional aspects and advantages will be obvious from the description below, or may be learned by practice of the present application.

DETAILED DESCRIPTION OF EMBODIMENTS

Figure 1:
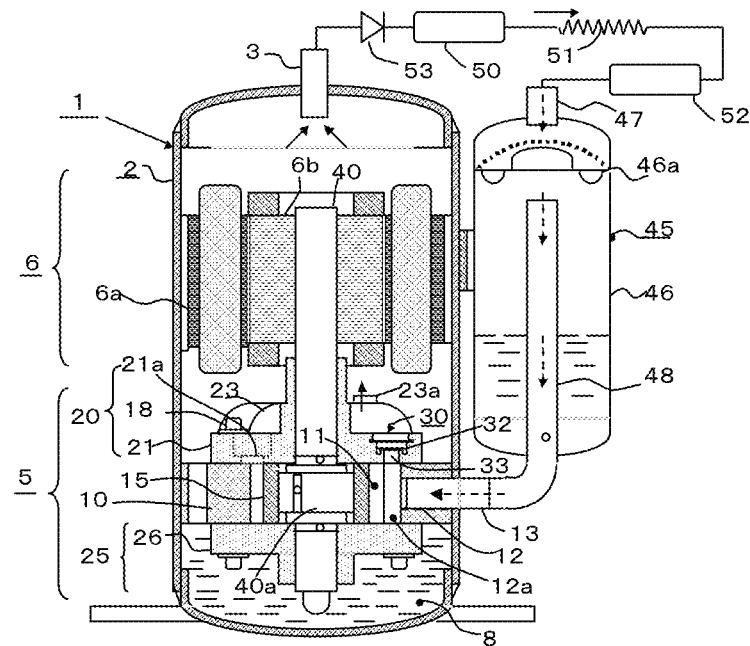
FIG. 1 is a schematic view showing a rotary compressor, and a refrigeration cycle device of an air conditioner coupled to the rotary compressor according to an embodiment of the present application.

The embodiments of the present application are described in detail below. Examples of the embodiments are shown in the accompanying drawings where throughout the same or similar reference numerals indicate the same or similar elements or elements with the same or similar functions. The embodiments described below with reference to the accompanying drawings are exemplary and are intended to be illustrative of the present application and are not to be construed as limiting the present application.

In the description of the present application, it should be understood that terms "longitudinal", "transverse", "length", "width", "thickness", "upper", "lower", "front", "rear", "left", "right", "vertical", "horizontal", "top", "bottom", "inner", "outer", etc. indicate the orientation or positional relationship based on the orientation or positional relationship shown in the drawings, and are only for the convenience of describing the present application and simplifying the description, rather than indicating or implying that the device or element must have a specific orientation or be constructed and operated in a specific orientation, and therefore cannot be understood as the limitation of the present application.

Furthermore, the terms "first" and "second" are used for descriptive purposes only and can not to be construed as indicating or implying relative importance or implicitly specifying the number of technical features indicated. Therefore, features defined by "first" and "second" may explicitly or implicitly include one or more such features. In the description of the present application, "plurality" means at least two, e.g., two, three, etc., unless specifically defined otherwise.

In the present application, unless otherwise specifically specified and defined, the terms "installation", "couple", "coupling", "fix", etc. should be interpreted broadly. For example, it can be a fixed connection, a detachable connection, or an integral connection; a mechanical connection or an electrical connection or mutual communication; a direct connection or an indirect connection through an intermediate medium, or an internal communication between two elements or the interaction between two elements. For those of ordinary skills in the art, the specific meaning of the above-mentioned terms in the present application can be understood according to specific circumstances.

The rotary compressor is represented by a rotary compressor in which a piston resolves and a sliding vane reciprocates, a rotary compressor in which a piston and a sliding vane rotate together, a scroll compressor having a fixed scroll and a movable scroll, and the like. Embodiments of the application disclose the technology of a rotary compressor which is most popular in household air conditioners.

Embodiment 1

FIG. 1 shows a construction of a rotary compressor 1, and a refrigeration cycle device of an air conditioner coupled to the rotary compressor 1 according to an embodiment of the present application. A hermetic housing 2 houses a compression mechanism 5, a motor 6, and lubricating oil 8 which is at the bottom. An outer circumference of a cylinder 10 of the compression mechanism 5 is fixed to an inner circumference of the hermetic housing 2 by spot welding, and a circular compression chamber 11 in a center of the cylinder 10 is sealed by a main shaft plate 21 of a main bearing 20 and an auxiliary shaft plate 26 of an auxiliary bearing 25.

A crankshaft 40 is in sliding fit with the main bearing 20 and the auxiliary bearing 25, and an eccentric shaft 40a of the crankshaft 40 drives a piston 15 to revolve in the compression chamber 11. A front end of a sliding vane 16 reciprocating in a sliding groove 14 of the cylinder 10 abuts against the outer circumference of the piston 15 (illustrated in FIGS. 4 and 5). The motor 6 is composed of, by shrink fit, a stator 6a fixed to the inner circumference of the hermetic housing 2 and a rotor 6b fixed to the crankshaft 40. In addition, the motor 6 has a constant speed of the 50 Hz power supply or 60 Hz power supply.

A low-pressure liquid reservoir 45 on the outer side of the hermetic housing 2 is composed of a container suction pipe 47 coupled to an upper portion of a cylindrical container 46, a gas-liquid refrigerant separating plate 46a inside the low-pressure cylindrical container 46, and a central pipe 48 provided at the center. A bent pipe at a lower end of the central pipe 48 is coupled to the suction pipe 13, and the suction pipe 13 is pressed into a suction hole 12 that opens to the compression chamber 11 from the outer circumference of the cylinder 10.

The main muffler 23 is fixed to the main shaft plate 21 of the main bearing 20 by a plurality of screws, and internally provided with a bypass device 30. The lower end of the bypass hole 33 located at the center opens to a U-shaped groove 12a processed at the open end of the suction hole 12 of the cylinder 10. The upper end of the bypass hole 33 is opened and closed by the bypass valve 32.

An exhaust pipe 3 located at a center of the upper end of the hermetic housing 2 is coupled to a condenser 50 of the refrigeration cycle device. The condenser 50 is coupled in the order of a capillary pipe 51, an evaporator 52, and a liquid reservoir 45. The refrigeration cycle device is featured with a check valve 53 provided between the exhaust pipe 3 and the condenser 50. In addition, the capillary pipe 51 may be an electronic expansion valve 51.

Referring to FIG. 1, the flow of refrigerant during the operation of the rotary compressor 1 is shown. Low-pressure gas (refrigerant) flowing from the central pipe 48 of the liquid reservoir 45 to the suction pipe 13 flows through the U-shaped groove 12a processed at the outlet side of the suction hole 12, is compressed into high-pressure gas by revolving of the piston 15, and is discharged from the exhaust hole 21a (dotted lines illustrated in FIG. 5) to the main muffler 23. The main muffler 23 is thus an exhaust muffler.

The high-pressure gas passing through the muffler exhaust hole 23a of the main muffler 23 flows into the lower space of the motor 6, and flows from the inner and outer gaps of the motor 6 to the upper space. During this period, most lubricating oil contained in the high-pressure gas is separated and merged with the lubricating oil 8 at the bottom of the hermetic housing 2.

The high-pressure gas passes through the check valve 53 from the exhaust pipe 3 and becomes a high-pressure liquid refrigerant at the condenser 50. The low-pressure refrigerant passing through the capillary pipe 51 evaporates at the evaporator 52, and flows into the cylindrical housing 46 from the housing suction pipe 47 of the liquid reservoir 45. The unevaporated liquid refrigerant is stored at the bottom of the cylinder housing 46, and the low-pressure gas refrigerant returns from the central pipe 48 to the suction pipe 13 of the cylinder 10.

When the motor 6 is stopped, the check valve 53 acts to close the exhaust pipe 3 due to the pressure difference between the condenser 50 and the hermetic housing 2. At this time, since the high-pressure gas of the hermetic housing 2 reversely flows to the liquid reservoir 45 from the suction pipe 13 opened to the low-pressure compression chamber 11 through the sliding gap (about 5-10 μm) of the piston 15, the sliding vane 16, and the like, the internal pressure of the liquid reservoir 45 rises and the pressure of the hermetic housing 2 falls.

Further, if the check valve 53 is closed, the high-pressure refrigerant of the condenser 50 cannot reversely flow into the inside of the hermetic housing 2, and the condenser 50 stores the high-pressure liquid refrigerant at a high temperature in operation. However, since the liquid refrigerant of the condenser 50 releases heat and flows out to the evaporator 52 through the capillary pipe 51, the pressure of the condenser 50 decreases.

Figure 2:
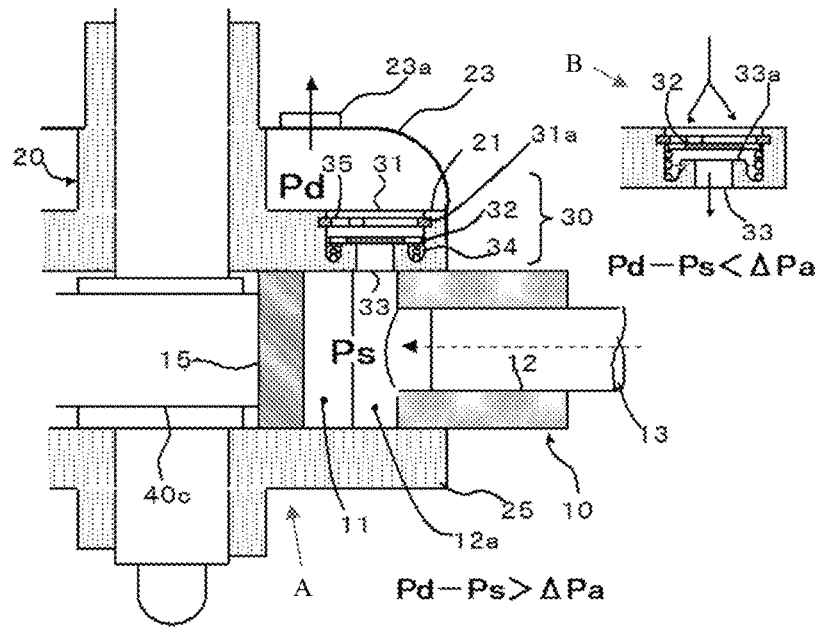
FIG. 2 is a detailed schematic structural view of a bypass device.
Figure 3:
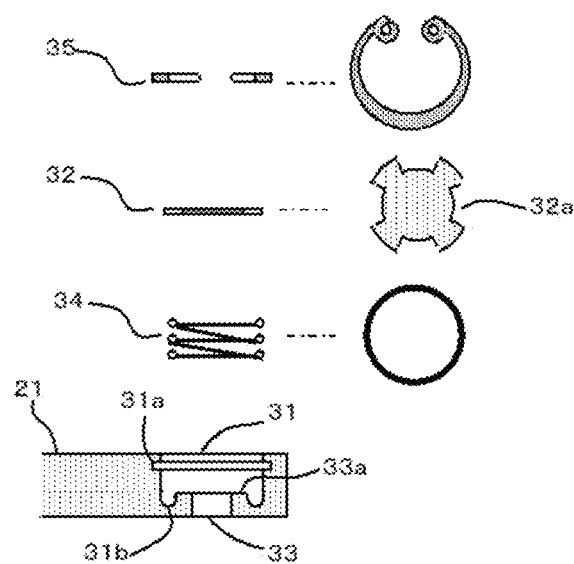
FIG. 3 is a detailed view of constituent components of the bypass device.

FIG. 2 is a detailed structural view of the bypass device 30. The action of the bypass device 30 is shown in both section A of FIG. 2 (when a bypass hole 33 is closed) and section B of FIG. 2 (when the bypass hole is open). Next, FIG. 3 is a detailed view of constituent components of the bypass device 30. In FIG. 2, the bypass device 30 has the bypass hole 33 in the center of a cylindrical hole 31 processed in the main shaft plate 21. A valve seat 33a is formed on the bypass hole 33, and a coil spring 34 is inserted into an outer circumferential groove thereof.

The coil spring 34 is a compression spring and always moves the bypass valve 32 in the direction of opening the bypass hole 33. The lower end of the coil spring 34 is located in the spring limiting groove 31b of the valve seat 33a, and the upper end of the coil spring 34 is coupled to the bypass valve 32. The C-shaped retainer ring 35 serves as a limiter of the bypass valve 32 and is embedded into the retainer ring groove 31a of the inner circumference of the cylindrical hole 31. Therefore, the bypass valve 32 moves up and down in the gap between the valve seat 33a and the C-shaped retainer ring 35 due to the pressure difference acting on its upper surface and lower surface. As illustrated in FIG. 3, four gas grooves 32a provided at the outer circumference of the bypass valve 32 become gas passages.

The design of the elastic force (spring constant) of the coil spring 34 and the diameter of the bypass hole 33 is critical and is a factor for determining the pressure difference (ΔP) at which the bypass hole 33 is opened and the flow through the bypass hole 33. In addition, ΔP=high pressure (Pd) of the main muffler 23−low pressure (Ps) of the U-shaped groove 12a, and the predetermined design pressure difference is ΔPa.

Section A of FIG. 2 shows a state in which the bypass hole 33 is closed by the bypass valve 32. The pressure difference is (Pd−Ps)>ΔPa at this time. On the other hand, Section B of FIG. 2 is a state in which the bypass hole 33 is opened by the bypass valve 32. The pressure difference is (Pd−Ps)<ΔPa at this time. That is, the design pressure difference (ΔPa) is the most important value for determining the change of the high pressure (Pd) and the low pressure (Ps) after the compressor is stopped and after the compressor is started.

Further, in the operation of the compressor, due to the resistance of the high-pressure gas passing through the muffler exhaust hole 23a, the high pressure of the main muffler 23≥the pressure of the hermetic housing 2, and the high pressure of the main muffler 23 rises slightly. This feature has the effect of shortening the restarting time of the compressor, which is one of the reasons for configuring the bypass device 30 in the main muffler 23.

Figure 4:
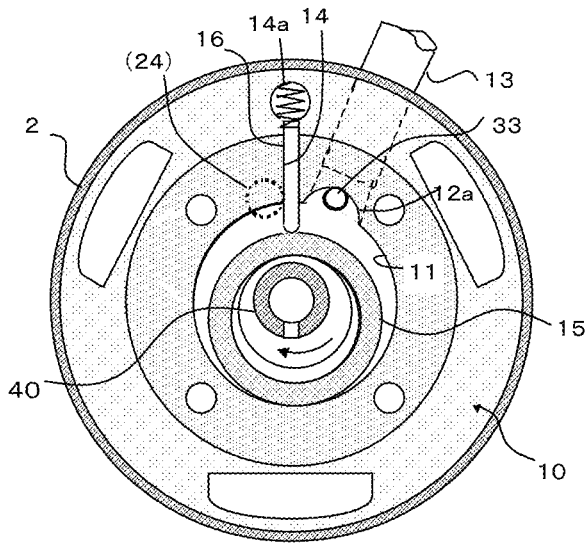
FIG. 4 is a plan view of an inside of a compression chamber and a cylinder viewed from below a compression mechanism.

FIG. 4 is a plan view of an inside of the compression chamber 11 and the cylinder 10 viewed from below the compression mechanism 5. The lower end of the bypass hole 33 opens to the U-shaped groove 12a, and the U-shaped groove 12a is located on the open end of the suction hole 12 of the cylinder 10. The pressure of the sliding vane back hole 14a is equal to that of the hermetic housing 2, and the sliding vane 16 reciprocates along the sliding vane groove 14. In addition, the pressure on an inner side of the piston 15 is also equal to that of the hermetic housing 2.

Figure 5:
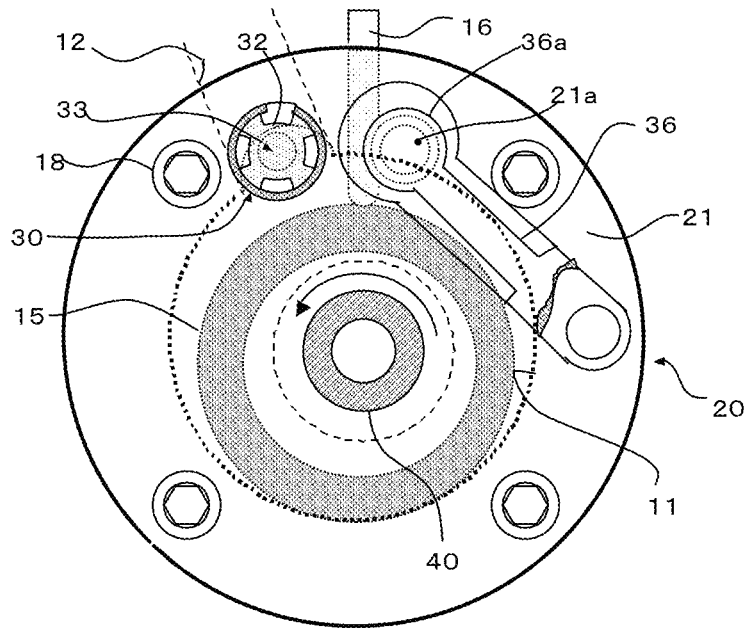
FIG. 5 is a plan view of a main bearing and an inside of a compression chamber in the cylinder view from above the compression mechanism.

FIG. 5 is a plan view of a main bearing 20 and an inside of the compression chamber 11 in the cylinder 10 viewed from above the compression mechanism 5, showing the bypass device 30 provided on the main shaft plate 21 of the main bearing 20, and the exhaust valve 24 that opens and closes the exhaust hole 21a. According to FIG. 5, the bypass device 30 and the exhaust device 36 may be configured on both sides of the sliding vane groove 16 without interfering with the installation of the bypass device 30 and the exhaust valve 36a, and other structural components.

Figure 6:
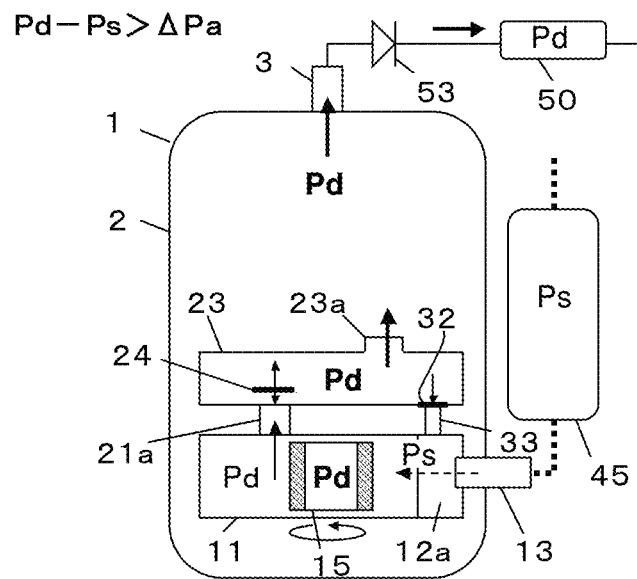
FIG. 6 is a schematic view showing the flow of a gas refrigerant in a stable operation of a rotary compressor.

Next, the function and effect of the additional bypass device 30 in the compression mechanism 5 will be described through the schematic diagrams of FIGS. 6 to 10. FIG. 6 shows the flow of the gas refrigerant in the stable operation of the rotary compressor 1. Low-pressure gas (pressure Ps) flowing from the liquid reservoir 45 into the suction pipe 13 is compressed into high-pressure gas (Pd) by the piston 15, and discharged from the main muffler 23 from the exhaust hole 21a. After the high-pressure gas discharged from the muffler exhaust hole 23a is discharged to the inside of the hermetic housing 2, it flows from the exhaust pipe 3 through the check valve 53 into the condenser 50.

In the operation of the compressor, since the pressure of the main muffler 23 is a stable high pressure, the pressure difference (ΔP) between the pressure (Pd) of the main muffler 23 and the pressure (low pressure Ps) of the U-shaped groove 12a is maximum, and the bypass hole 33 is closed such that the high-pressure gas of the main muffler 23 does not flow out to the low-pressure U-shaped groove 12a. That is, Pd−Ps>ΔPa.

Figure 7:
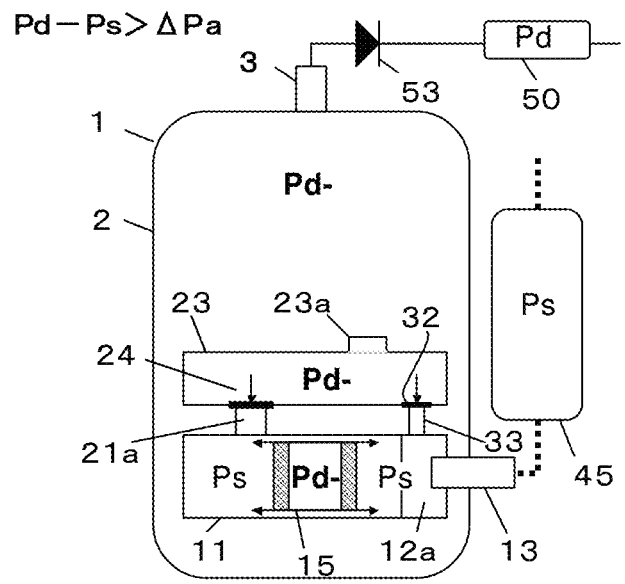
FIG. 7 is a schematic view of the rotary compressor when it is just stopped.

In FIG. 7, if the compressor in operation stops, since high-pressure gas leaks into the compression chamber 11 from the sliding gap or the like of the piston 15 and the sliding vane 16, the pressure of the hermetic housing 2 is gradually reduced, and the check valve 53 is closed. At this time, the pressure of the hermetic housing 2 is equal to that of the main muffler 23. Because of the slightly reduced high pressure (Pd−), the ΔP relative to the low-pressure U-shaped groove 12a is reduced, and the bypass hole 33 is closed.

Figure 8:
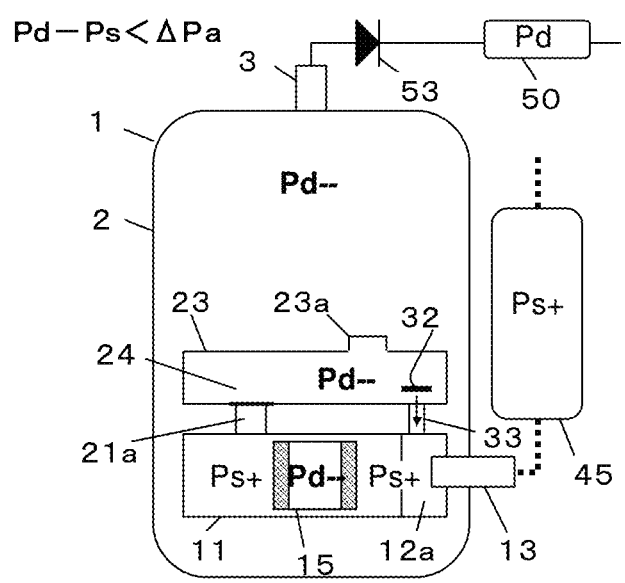
FIG. 8 is a schematic view of a rotary compressor with a stopping time continues for about 10 seconds.

If the stopping time lasts about 10 seconds, as illustrated in FIG. 8, the pressure of the hermetic housing 2 and the inner diameter pressure of the piston 15 are reduced to Pd−−. On the other hand, due to the gas leakage described above, the pressure of the compression chamber 11 rises to Ps+. As a result, the ΔP of the main muffler 23 and the U-shaped groove 12a is smaller than ΔPa (designed pressure difference). Accordingly, the bypass hole 33 is opened. That is, Pd−Ps<ΔPa.

Figure 9:
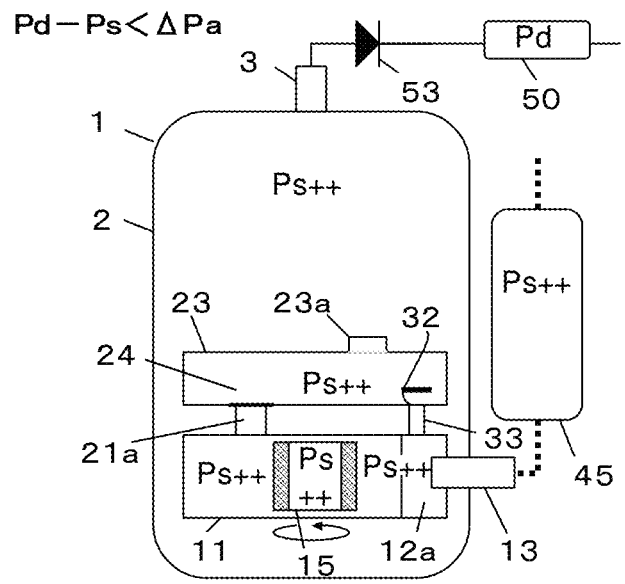
FIG. 9 is a schematic view of a rotary compressor with a stopping time continues for about 30 seconds.

If the stopping time continues for about 20 seconds (totaling about 30 seconds), as illustrated in FIG. 9, since the pressure of the hermetic housing 2 is reduced to be equal to that of the compression chamber 11, the pressure of the hermetic housing 2 is reduced to Ps++. On the other hand, the pressure of the compression chamber 11 rises to Ps++, and the pressure of the hermetic housing 2 is equal to that of the compression chamber 11. At this time, since Pd−Ps<ΔPa, the time at which the pressure of the hermetic housing 2 and that of the compression chamber 11 become equal is the earliest.

Figure 10:
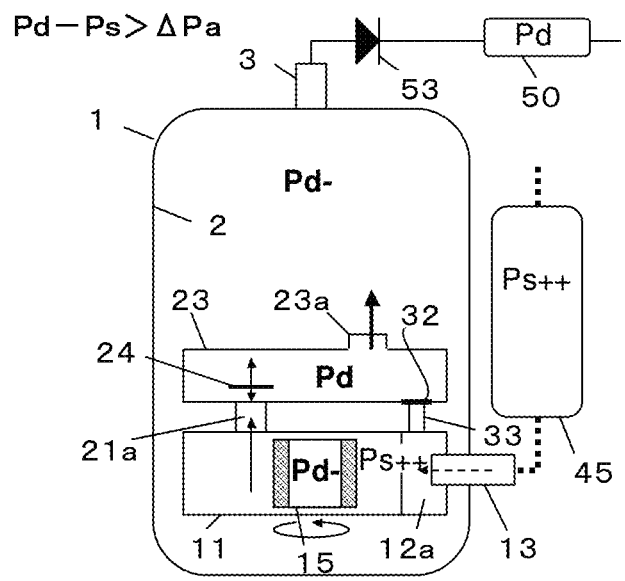
FIG. 10 is a view showing a state in which a rotary compressor is restarted for 15 seconds after 30 seconds from the state (stopping) as illustrated in FIG. 9.

FIG. 10 shows the state in which a rotary compressor 1 is restarted for 15 seconds after 30 seconds from the state (stopping) as illustrated in FIG. 9. Since the rotary compressor starts from the state (Ps++) where the gas suction pressure is high, the pressures of the main muffler 23 and the hermetic housing 2 rise rapidly and the pressure difference thereof is greater than ΔPa such that the bypass hole 33 is closed. That is, Pd−Ps>ΔPa.

However, since Pd−Ps<ΔPa within 15 seconds of the opening of the bypass hole 33, a portion of the high-pressure gas of the main muffler 23 reversely flows into the U-shaped groove 12a. The pressure rise of the hermetic housing 2 is delayed compared to the conventional compressor without the bypass hole 33. In addition, if the pressure of the hermetic housing 2 reaches about the pressure (Pd) of the condenser 50, the check valve 53 is opened and the state of FIG. 6 can be restored.

Here, according to Embodiment 1, by configuring the bypass device 30 in the main muffler 23, the following advantages can be achieved. The increase of the pressure of the hermetic housing 2 is accelerated by rapidly closing the bypass hole 33 after the compressor is started. Moreover, the flow of the refrigerant in the bypass hole 33 is prevented from weakening due to the lubricating oil 8 of the hermetic housing 2 flowing into the bypass hole 33. In addition, the problem of lubricating oil 8 flowing in from the bypass hole 33 flowing out to the liquid reservoir 45 through the suction pipe 13 in advance can be avoided.

Figure 11:
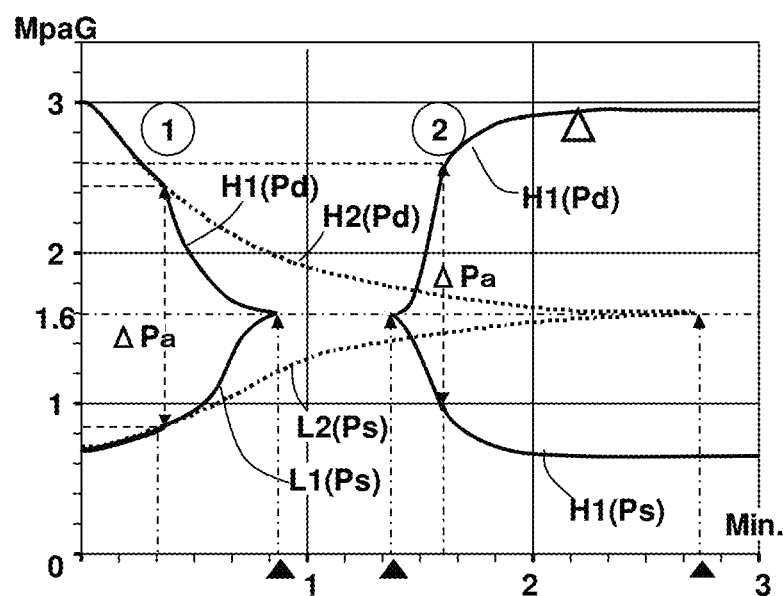
FIG. 11 is a schematic diagram showing the comparison between the changes of the high-pressure side pressure (Pd) and the low-pressure side pressure (Ps) after the motor is stopped for the rotary compressor of the present application having the bypass device and the changes of the high-pressure side pressure (Pd) and the low-pressure side pressure (Ps) after the motor is stopped for the conventional rotary compressor without the bypass device and also showing a pressure change diagram of the high pressure (Pd) and the low pressure (Ps) when the rotary compressor is restarted after 30 seconds of a complete stop.

FIG. 11 compares the changes of the high-pressure side pressure (Pd) and the low-pressure side pressure (Ps) after the motor 6 is stopped with regard to the rotary compressor 1 of the present application having the bypass device 30 and the conventional rotary compressor without the bypass device, as shown by the lines identified by numeral ①; and shows the pressure change of the high pressure (Pd) and the low pressure (Ps) when the rotary compressor 1 is restarted after 30 seconds of a complete stop, as shown by the lines identified by numeral ②. These are intended to supplement the description of the action of the bypass device 30 described in FIGS. 6-10.

According to the lines identified by numeral ① of FIG. 11, the horizontal axis is the elapsed time (in minutes) after the compressor is stopped or restarted, and the vertical axis is the operating pressure (MPaG). The solid line is the rotary compressor 1, and the dotted line is the conventional rotary compressor. H1 (Pd) and L1 (Ps) are the high pressure and low pressure respectively of the rotary compressor 1. On the other hand, the dotted lines H2 (Pd) and L2 (Ps) are high pressure (hermetic housing pressure) and low pressure (suction pipe pressure) of the conventional rotary compressor, respectively.

Further, the rotary compressor 1 according to Embodiment 1 and the conventional rotary compressor are equipped in an air conditioner using a refrigerant R410A. According to the lines identified by numeral ①, the operating pressure of the rotary compressor 1 and the conventional rotary compressor before and when stopping is the same, the high pressure (Pd) being 3.0 MPaG and the low pressure (Ps) being 0.7 MPaG.

According to the lines identified by numeral ①, when the rotary compressor 1 is stopped, Pd is reduced and Ps rises. Thereafter, after about 20 seconds, H1 (Pd) rapidly reduces and the low pressure L1 (Ps) rapidly rises due to the opening of the bypass hole 33. As a result, the high pressure and the low pressure become an equilibrium pressure of 1.6 MPaG after 52 seconds. In addition, when the rotary compressor 1 is stopped, the bypass hole 33 remains open.

On the other hand, the conventional rotary compressor (dotted line) stops operating, and the changes of H2 (Pd) and L2 (Ps) before about 20 seconds are the same as the rotary compressor 1. However, the subsequent pressure change is little, and it becomes an equilibrium pressure of 1.6 MPaG after about 2 minutes and 44 seconds. As a result, the elapsed time of the restart is about three times that of the rotary compressor 1.

Next, according to the lines identified by numeral ② of FIG. 11, the equilibrium pressure of 1.6 MPaG is reached and the rotary compressor 1 restarts after 30 seconds. Since the pressure difference after about 15 seconds is greater than ΔPa, the bypass hole 33 is closed. The subsequent pressure change is not much different from the conventional compressor.

Further, as described above, since the pressure of the condenser 50 reduces when the rotary compressor 1 is stopped, the high pressure (Pd) is still less than 3.0 MPaG even if the bypass hole 33 is closed. The Δ symbol on the H1 (Pd) line of the lines identified by numeral ② of FIG. 11 indicates that the check valve 53 is open.

Therefore, in the rotary compressor 1 having the bypass device 30, the balance time of the high pressure and the low pressure after the compressor is stopped is about 30% as before. And it can be ensured that the pressure change characteristic after the restart of the compressor is not much different from that of the conventional compressor.

Embodiment 2

Figure 12:
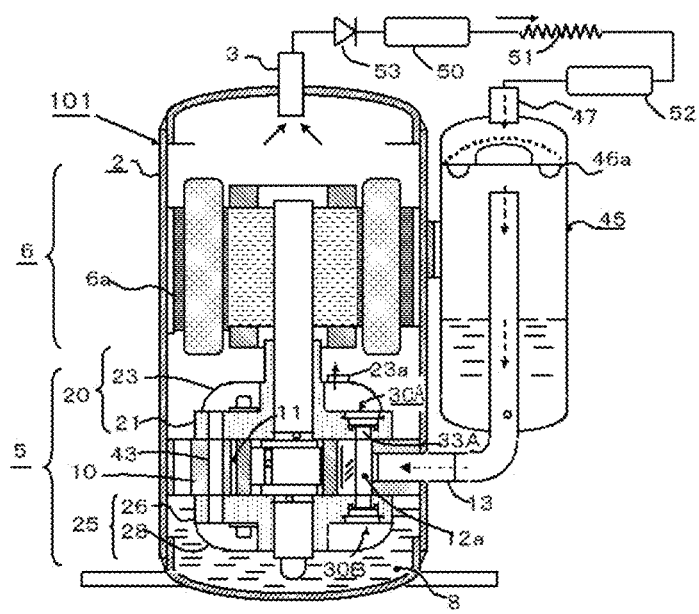
FIG. 12 is a schematic view showing that each of a main shaft plate and an auxiliary shaft plate is provided with a bypass device.

A rotary compressor 101 illustrated in FIG. 12 has features that a bypass device 30A and a bypass device 30B are provided at a main shaft plate 21 and an auxiliary shaft plate 26, respectively. The bypass device 30B of the auxiliary shaft plate 26 is covered by the auxiliary muffler 28.

After the rotary compressor 101 is started, the high-pressure gas is discharged from a compression chamber 11 to a main muffler 23 on the main shaft plate 21, and is discharged from a muffler exhaust hole 23a to the inside of a hermetic housing 2. At this time, the internal pressure of the auxiliary muffler 28 becomes equal to the pressure of the main muffler 23 through a through-hole 43 in a compression mechanism 5. In addition, the high-pressure gas discharged to the inside of the hermetic housing 2 is discharged from an exhaust pipe 3 to a condenser 50 through a motor 6 as in Embodiment 1.

Similar as in Embodiment 1, when the pressure difference (ΔP) between the main muffler 23 and the U-shaped groove 12a is greater than the predetermined design pressure, the bypass device 30A and the bypass device 30B close simultaneously. Therefore, the internal pressure of the hermetic housing 2 rises rapidly, and the rotary compressor 101 discharges gas from the exhaust pipe 3 to the condenser 50.

Thereafter, if the rotary compressor 101 is stopped, the pressure of the compression chamber 11 rises due to decrease in the internal pressure of the hermetic housing 2, the pressure difference thereof becomes lower than the design pressure (ΔPa), and the bypass device 30A and the bypass device 30B open simultaneously. Since the reducing speed of the internal pressure of the hermetic housing 2 is twice that of the rotary compressor 1 of Embodiment 1, Embodiment 2 can further shorten the time of the high pressure (Pd) and the low pressure (Ps) becoming equal. In this way, compared with Embodiment 1, Embodiment 2 has the effect of shortening the stopping time of the compressor although the rising speed of high pressure reduces after the compressor is started.

According to Embodiment 2, the bypass device 30A and the bypass device 30B are provided on the main shaft plate 21 and the auxiliary shaft plate 26 coupling to one cylinder 10, respectively. For example, in a two-cylinder rotary compressor, the bypass device 30A and the bypass device 30B may also be provided on the two cylinders, respectively. As a result, even with a double-cylinder rotary compressor, a reduction in pressure balancing time comparable to that of a single-cylinder rotary compressor can be achieved.

Embodiment 3

Figure 13:
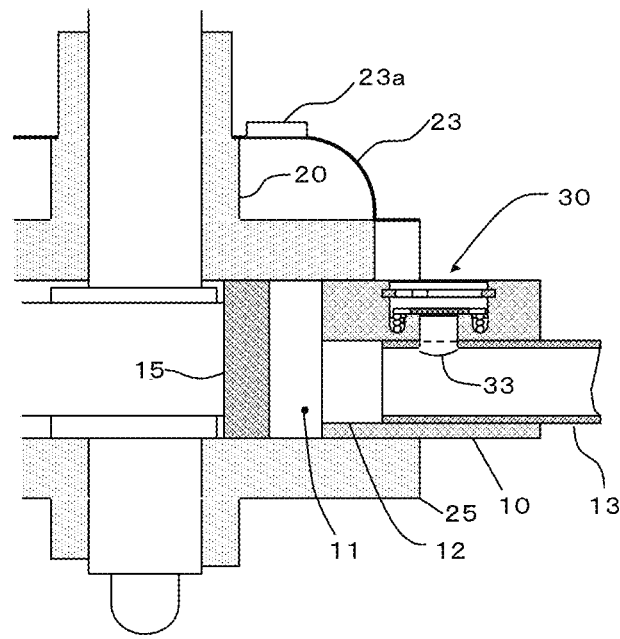
FIG. 13 is a schematic view showing that a bypass device is provided on an outer circumferential wall of a cylinder.

FIG. 13 shows a design example in which a bypass device 30 is provided on the outer circumferential surface of the cylinder 10. The lower side of the bypass hole 33 opens to the inside of the suction pipe 13. In addition, the U-shaped groove 12a necessary in Embodiment 1 may be omitted.

Compared with Embodiment 1, in Embodiment 3, since the upper side of the bypass hole 33 is on the outer side of the main muffler 23, (1) the pressure increase (Pd+) at the start of the compressor cannot be utilized, and therefore, the time to reach the pressure of the condenser 50 after the compressor is started is slightly delayed; and (2) lubricating oil 8 may flow into the bypass hole 33, however, the design of low oil amount is not problematic.

A rotary compressor according to an embodiment of the present application will now be described in detail with reference to FIGS. 1 to 13.

Referring to FIG. 1, a rotary compressor according to an embodiment of the present application includes: a housing 2, a motor 6, a compression mechanism 5, an exhaust pipe 3, a suction pipe 13, and a bypass device 30. The housing 2 can be a hermetic housing, the motor 6 and the compression mechanism 5 are provided in the housing 2, the compression mechanism 5 is driven by the motor 6, the exhaust pipe 3 is communicated with the inside of the housing 2, a first end of the suction pipe 13 is coupled to the compression mechanism 5, and a second end of the suction pipe 13 is coupled to a liquid reservoir 45.

The bypass device 30 has a bypass hole 33 through which the gas in the housing 2 flows to the suction pipe 13 or to a low-pressure circuit communicated with the suction pipe 13 after the motor 6 is stopped, such that the pressure of the housing 2 is rapidly reduced to be equal to that of the compression chamber 11 of the compression mechanism 5 to shorten restarting time of the compressor.

For example, as illustrated in FIGS. 2-3, the bypass device 30 may include: a bypass valve 32 and a spring 34. The bypass valve 32 opens or closes the bypass hole 33 due to the pressure difference between the hermetic housing 2 and the suction pipe 13. The bypass valve 32 opens the bypass hole 33 when the pressure difference between the hermetic housing 2 and the suction pipe 13 is less than a preset value. The bypass valve 32 closes the bypass hole 33, when the pressure difference between the hermetic housing 2 and the suction pipe 13 is greater than the preset value. The spring 34 moves the bypass valve 32 in the direction of opening the bypass hole 33. In the embodiment illustrated in FIG. 2, the spring 34 is a compression spring, located below the bypass valve 32, always exerting an upward thrust on the bypass valve 32. In some unillustrated embodiments, the spring 34 may also be located above the bypass valve 32, always exerting an upward pulling force on the bypass valve 32.

For example, the pressure difference between the pressure Pd of the housing 2 and the pressure Ps of the suction pipe 13 is $\Delta P$. $\Delta P=Pd-Ps$. When $\Delta P>\Delta Pa$, as illustrated in FIG. 2A, the resilience of the spring 34 is insufficient to resist the pressure difference, and the bypass valve 32 closes the bypass hole 33. When $\Delta P<\Delta Pa$, as illustrated in FIG. 2B, the resilience of the spring 34 is sufficient to resist the pressure difference. The bypass valve 32 opens the bypass hole 33, and the high-pressure gas in the housing 2 can enter the suction pipe 13 through the bypass hole 22.

The compression mechanism 5 includes: a cylinder 10, a main bearing 20, and an auxiliary bearing 25. The main bearing 20 is located at a first end of the cylinder 10, and the auxiliary bearing 25 is located at a second end of the cylinder 10. In other words, the cylinder 10 has a compression chamber 11, a main shaft plate 21 of the main bearing 20 and an auxiliary shaft plate 26 of the auxiliary bearing 25 are provided at two open side surfaces of the compression chamber 11, and a bypass device 30 is provided on at least one of the main shaft plate 21 and the auxiliary shaft plate 26.

For example, in the embodiment illustrated in FIG. 1, the main shaft plate 21 of the main bearing 20 is provided with a bypass device 30.

Also in the embodiment illustrated in FIG. 12, each of the main shaft plate 21 of the main bearing 20 and the auxiliary shaft plate 26 of the auxiliary bearing 25 is provided with a bypass device 30. For example, the main shaft plate 21 of the main bearing 20 is provided with a bypass device 30A, and the auxiliary shaft plate 26 of the auxiliary bearing 25 is provided with a bypass device 30B such that the reducing speed of the pressure of the housing 2 and the rising speed of the pressure of the compression chamber 11 can be further accelerated, thereby further shortening the restarting time of the compressor.

Further, a side of the main bearing 20 facing away from the cylinder 10 is provided with a main muffler 23, a side of the auxiliary bearing 25 facing away from the cylinder 10 is provided with an auxiliary muffler 28, and the compression mechanism 5 has a through-hole 43 communicating the main muffler 23 with the auxiliary muffler 28. A first end of the bypass hole 33 communicates with a muffling chamber of a corresponding muffler, and a second end of the bypass hole 33 communicates with the suction pipe 13 or a low-pressure circuit communicated with the suction pipe 13. As illustrated in FIG. 12, the upper end of the bypass device 30A communicates with the muffling chamber of the main muffler 23. The muffling chamber of the main muffler 23 communicates with the inside of the housing 2 through the muffler exhaust hole 23a, and the lower end of the bypass hole 33 communicates with the suction pipe 13. The upper end of the bypass device 30B communicates with the suction pipe 13, the lower end of the bypass device 30B communicates with the muffling chamber of the auxiliary muffler 28, and the muffling chamber of the auxiliary muffler 28 communicates with the inside of the housing 2 through the through-hole 43 and the muffler exhaust hole 23a.

In some unillustrated embodiments, the bypass device 30 may also be provided only on the auxiliary shaft plate 26 of the auxiliary bearing 25.

In the embodiment illustrated in FIG. 13, the compression mechanism 5 includes: a cylinder 10, a main bearing 20, and an auxiliary bearing 25. The main bearing 20 is located at a first end of the cylinder 10, the auxiliary bearing 25 is located at a second end of the cylinder 10, the bypass device 30 is provided on the outer circumferential surface of the cylinder 10, and at the time, the upper end of the bypass hole 33 is directly communicated with the inside of the housing 2, and the lower end of the bypass hole 33 is communicated with the suction pipe 13.

A check valve 53 is provided between the high-pressure side of the refrigeration cycle device and the exhaust pipe 3. The check valve 53 prevents the high-pressure gas on the high-pressure side of the refrigeration cycle device from reversely flowing into the exhaust pipe 3 when the motor 6 is stopped. Alternatively, the check valve 53 is a one-way valve or an electromagnetic on-off valve to ensure that the gas in the exhaust pipe 3 can enter the high-pressure side of the refrigeration cycle device through the check valve 53, and the high-pressure gas on the high-pressure side of the refrigeration cycle device cannot reversely flow into the exhaust pipe 3.

Referring to FIGS. 1, 6-10, and 12, a condenser 50 is coupled to a first end of the exhaust pipe 3, and the check valve 53 is provided between the condenser 50 and the exhaust pipe 3. When the motor 6 is stopped, the check valve 53 prevents the high-pressure gas of the condenser 50 from flowing into the exhaust pipe 3, thereby ensuring that the high-pressure gas in the housing 2 can enter the compression chamber 11 as soon as possible, and further ensuring that the pressure in the housing 2 can be reduced as soon as possible to be equal to the pressure in the compression chamber 11, to shorten the restarting time of the compressor.

The bypass device 30 in the main muffler 23 on the upper side of the main bearing 20 has a bypass hole 33. A U-shaped groove 12a is defined at the junction of the suction pipe 13 and the cylinder 10, the upper end of the bypass hole 33 is communicated with the high-pressure main muffler 23, and the lower end of the bypass hole 33 is communicated with the low-pressure U-shaped groove 12a. When the motor 6 is stopped and the check valve 53 in the exhaust pipe 3 is closed, the high-pressure of the hermetic housing 2 reduces and the low-pressure of the compression chamber 11 rises. If the bypass hole 33 is opened by the reduction in the pressure difference between the hermetic housing 2 and the compression chamber 11, the high-pressure gas of the hermetic housing 2 passes through the main muffler 23 and the bypass hole 33, and flows out to the suction pipe 13 from the U-shaped groove 12a. Therefore, since the pressure of the hermetic housing 2 and the pressure of the suction pipe 13 become equal in a short time, the rotary compressor 1 can be rapidly restarted.

The rotary compressor according to the embodiment illustrated in FIGS. 1-13 of the present application has the beneficial effects as follows.

1) In the world's most popular air conditioner in which the temperature of the air conditioner is controlled by On/Off (in and out of operation) of a rotary compressor, since the stopping time of the compressor can be reduced to about 30% of that of the conventional one, the restarting time can be greatly shortened.

2) Through the effect, the change of the temperature of the air conditioner is small, and the APF (annual performance factor) can be improved.

3) The bypass device 30 of the present application may be added to a rotary compressor equipped with a variable frequency motor with variable rotating speed. In this applied design, the stopping time of the compressor can be shortened, for example, during defrosting.

4) The feature of adding a small bypass device 30 to the conventional rotary compressor can achieve the purpose of shortening the restarting time through small modification and low cost.

5) The bypass device 30 of the present application is also applicable to double-cylinder and horizontal rotary compressors.

A rotary compressor according to another embodiment of the present application will now be described in detail with reference to FIGS. 14 to 20. In order to solve the problems of long restarting time after the compressor stops and the long time required for changing the housing pressure of the compressor from low pressure to high pressure after the restart, the rotary compressor of the present application has features that the pressure of the housing 2 is kept at medium pressure, to stop and restart the compressor. The details are illustrated in the following embodiments. Representative examples of the rotary compressor are a rotary compressor and a scroll compressor having high internal pressure in the housing.

Figure 14:
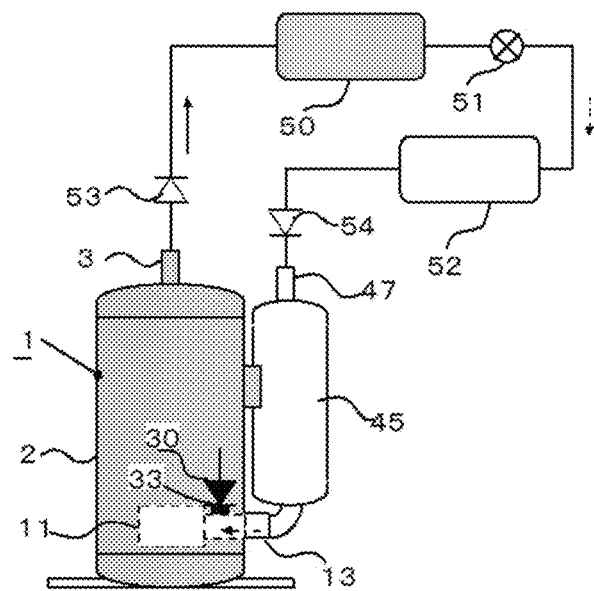
FIG. 14 is a schematic diagram of an air conditioning refrigeration cycle including a compressor of the present application in a stable operation.

FIG. 14 shows a schematic diagram of an air conditioning refrigeration cycle including a compressor 1 of the present application in stable operation. The low-pressure refrigerant of a liquid reservoir 45 is sucked into a compression chamber 11 from a suction pipe 13 of the compressor 1, and the high-pressure gas compressed in the compression chamber 11 is discharged to the hermetic housing 2.

The high-pressure refrigerant discharged from the exhaust pipe 3 moves to a condenser 50 through a second check valve device 53 (i.e., the check valve 53 described above), and herein the condensed liquid refrigerant becomes a low-pressure refrigerant through the electric expansion valve 51, evaporates at an evaporator 52 to form a low-pressure gas, passes through a first check valve device 54, and flows from a low-pressure pipe 47 into the liquid reservoir 45.

The compressor 1 has the features that a pressure equalizing device 30, namely the above-mentioned bypass device 30, is provided on a compression mechanism 5 fixed inside the housing 2. In the operation of the compressor 1, as will be noted later, a bypass hole 33 of the pressure equalizing device 30 is closed such that the high-pressure gas of the housing 2 does not flow into the suction pipe 13.

Figure 15:
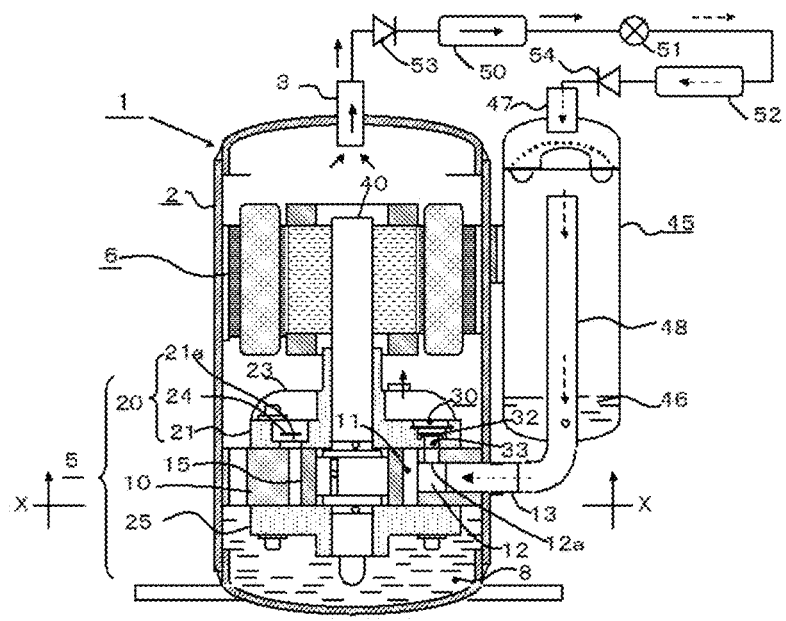
FIG. 15 is a schematic view showing an internal construction of a compressor in operation.
Figure 16:
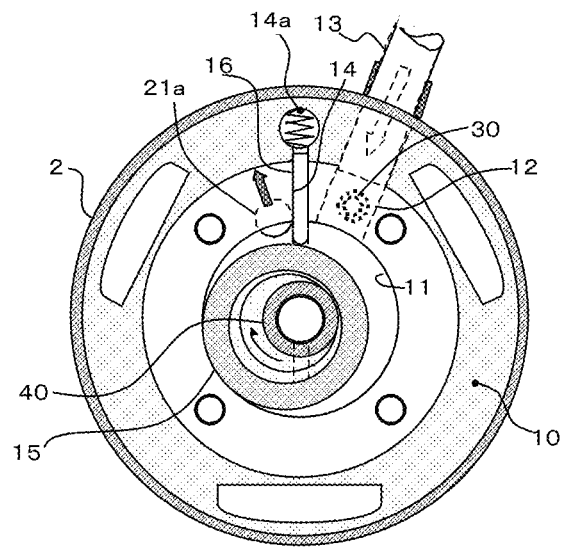
FIG. 16 is a schematic view of the X-X section of FIG. 15.

FIG. 15 shows the internal construction of the compressor 1 in operation. FIG. 16 shows a section taken along X-X in FIG. 15. In FIG. 15, a motor 6 and compression mechanism 5 are provided in the housing 2, and lubricating oil 8 is provided in the bottom of the housing 2. The outer circumference of the cylinder 10 of the compression mechanism 5 is fixed to the inner circumference of the housing 2 by spot-welding, and the main bearing 20 and the auxiliary bearing 25 seal the cylindrical compression chamber 11 in the center of the cylinder 10.

The crankshaft 40 driven by the motor 6 is in sliding fit with the main bearing 20 and the auxiliary bearing 25, and the crankshaft 40 drives the rolling piston 15 to revolve in the compression chamber 11. At this time, the rolling piston 15 sucks in low-pressure gas and discharges the gas from the exhaust hole 21a of the exhaust valve 24 to the muffler 23. Thereafter, the high-pressure gas is discharged from the exhaust pipe 3 through the motor 6.

The cylindrical liquid reservoir 45 fixed at an outer side of the housing 2, like a general liquid reservoir, is coupled at the upper part to a low-pressure pipe 47, and has a central pipe 48 at the center. The bent pipe at the lower end of the central pipe is coupled to the suction pipe 13, and the suction pipe 13 is pressed into a suction hole 12 which opens to the compression chamber 11 from the outer circumference of the cylinder 10. A small amount of liquid refrigerant is stored in the liquid reservoir 45.

The compressor 1 is equipped with a pressure equalizing device 30 on the main shaft plate 21 of the main bearing 20, and the pressure equalizing device 30 has a bypass hole 33 whose upper open end is located inside the muffler 23. As illustrated in FIG. 16, the front end of the sliding vane 16 which reciprocates in the sliding groove 14 of the cylinder 10 abuts against the outer circumference of the rolling piston 15 which revolves in the compression chamber 11. The pressure equalizing device 30 is configured above the suction hole 12.

Figure 17:
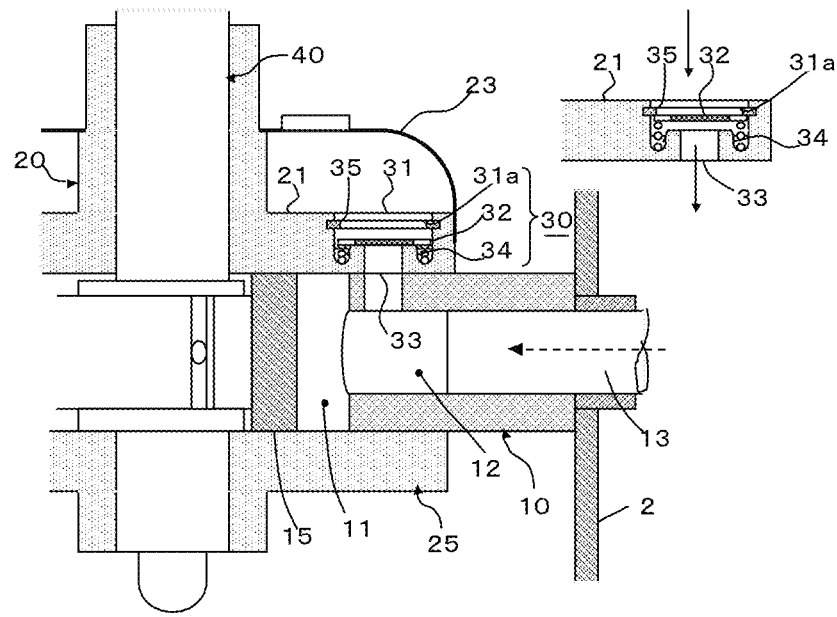
FIG. 17 is a schematic sectional view of a compression mechanism showing a construction of a pressure equalizing device.

FIG. 17 is a section of the compression mechanism 5, showing the construction of the pressure equalizing device 30. The pressure equalizing device 30 has a bypass hole 33 in the center of the cylindrical hole 31 processed in the main shaft plate 21, and the lower end of the bypass hole 33 communicates with the suction hole 12 of the cylinder 10. In the operation of the compressor 1, the bypass valve 32, which is an open-close valve, rests on the upper end of the bypass hole 33.

The bottom and upper portions of the cylindrical hole 31 are respectively provided with a coil spring 34 and a limiter 35, and the coil spring 34 presses the bypass valve 32 toward the limiter 35. In the operation of the compressor 1, the pressure inside the housing 2 becomes high pressure, and the suction hole 12 is low pressure. Thus, the bypass valve 32 closes the bypass hole 33.

However, after the compressor 1 is stopped, the pressure of the housing 2 reduces. After the pressure of the suction hole 12 rises, the bypass hole 33 is opened by a pressing force of the coil spring 34, and the outer circumference of the bypass valve 32 rests on the limiter 35. Therefore, as illustrated in the upper right of FIG. 17, the high-pressure gas of the housing 2 flows out to the suction hole 12 through the bypass hole 33.

After the compressor 1 is stopped, the pressure of the housing 2 reduces and the pressure of the suction hole 12 rises. This phenomenon is found in a rotary compressor having a high pressure inside the housing 2 in which the compression mechanism 5 is built. For example, the compressor 1 is a rotary compressor. As illustrated in FIG. 16, since the inner diameter of the rolling piston 15 which slides due to its revolving and the back surface hole 14*a* of the sliding vane 16 that reciprocates are at high pressure, the high-pressure gas of the housing 2 leaks to the compression chamber 11 through the sliding gap of the sliding surface of the part. That is, in the operation of the compressor 1, all the gas leaked to the compression chamber 11 is compressed again and discharged into the housing 2.

Figure 18:
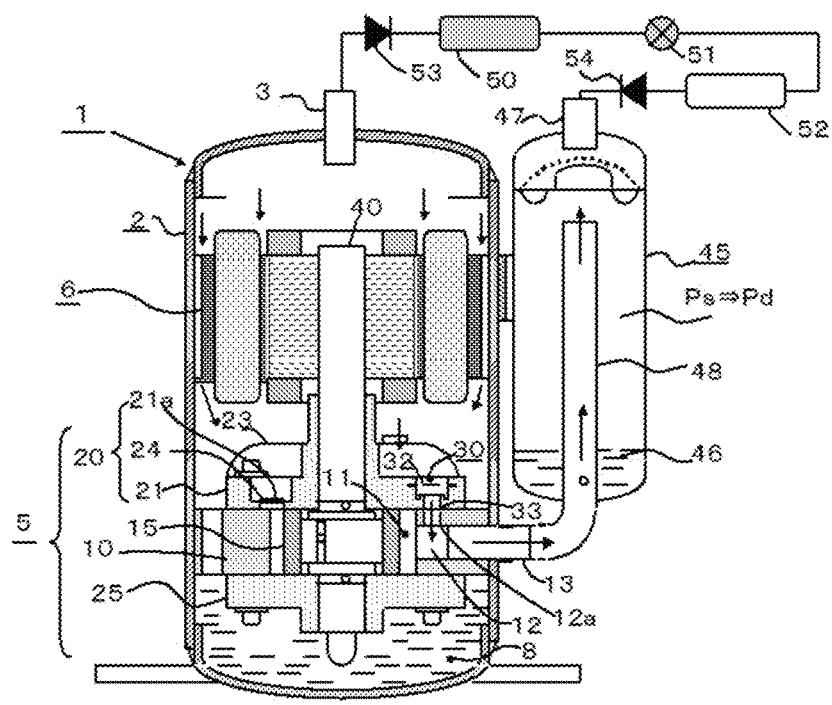
FIG. 18 is a schematic view showing an internal construction of a compressor after the compressor is stopped.

However, as illustrated in FIG. 18, after the compressor 1 is stopped, the exhaust hole 21*a* is closed under the action of the exhaust valve 24, and the gas leaked to the compression chamber 11 flows to the liquid reservoir 45 through the suction pipe 13. Therefore, the pressure of the housing 2 reduces and the pressure of the liquid reservoir 45 rises. In addition, the evaporator 52 is maintained at low pressure because the first check valve device 54 prevents high-pressure gas flowing into the liquid reservoir 45 from flowing into the evaporator 52.

After the pressure of the housing 2 becomes lower, the pressure of the housing 2 will be lower than that of the condenser 50. At this time, the second check valve device 53 is closed. Therefore, the condenser 50 can maintain a high-pressure state before stopping operation. At this time, the electric expansion valve 51 is closed by controlling. However, since the capillary valve or the like cannot be valve-controlled, the pressure of the condenser 50 slowly decreases and the pressure of the evaporator 52 increases.

Figure 19:
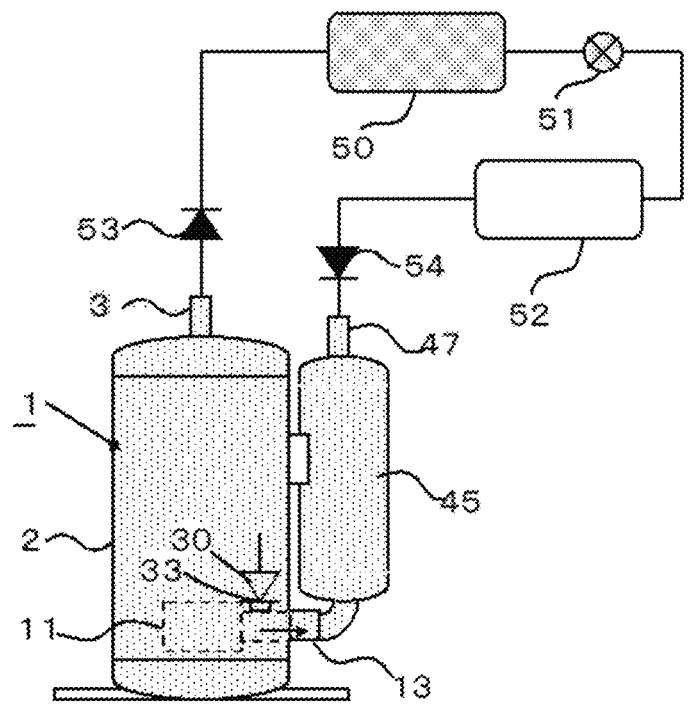
FIG. 19 shows a pressure distribution view of a refrigeration cycle device when the pressures of a housing, a liquid reservoir, a compression chamber, and the like become equal after the compressor is stopped.

FIG. 19 shows the pressure distribution of a refrigeration cycle device when the pressure of the housing 2, liquid reservoir 45, compression chamber 11, and the like becomes equal after the compressor 1 is stopped. The pressure of the liquid reservoir 45 is consistent with that of the housing 2, which is at high pressure, lower than the pressure of the condenser 50.

Here is an example: in a rotary compressor equipped on a domestic air conditioner, removing the combined volume of the compression mechanism 5, the motor 6, and the lubricating oil 8, the space volume (C) of the housing 2 is about 2100 cc; if the internal volume (A) of the liquid reservoir 45 is about 700 cc, the liquid reservoir volume is ⅓ of the space volume of the housing.

On the other hand, when the refrigerant used for the air conditioner is R410A, the internal pressure of the housing 2 is 3.0 MPaA and the internal pressure of the liquid reservoir 45 is 1.0 MPaA before the operation is stopped; the stopping of the compressor 1 renders the high-pressure gas to flow from the housing 2 to the liquid reservoir 45 such that the two become equal to 2.5 MPaA at night.

As a result, the pressure of the housing 2 of the compressor 1 in operation reduces from 3.0 MPaA to 2.5 MPaA, and the pressure of the liquid reservoir 45 rises from 1.0 MPaA to 2.5 MPaA. When the operation of the compressor 1 is stopped, and after the pressure of the liquid reservoir 45 and that of the housing 2 of the compressor 1 are equal, the compressor 1 can be restarted, and the rising speed of the pressure is remarkably increased.

Next, the motor 6 is energized from the stationary state of FIG. 19, and after the compressor 1 is restarted, the rolling piston 15 revolves to flow the high-pressure gas of the liquid reservoir 45 into the compression chamber 11. At this time, the pressure of the liquid reservoir 45 and the gas pressure of the housing 2 are equal, and no large load will be brought to the motor such that it can be restarted.

After it is started, for example, since the bypass hole 33 of the pressure equalizing device 30 is opened within 10 seconds, the pressure difference between the housing 2 and the liquid reservoir 45 does not rapidly increase, and the high-pressure gas of the compression chamber 11 is compressed and then passes through the exhaust hole 21*a*. Thereafter, it is mixed into the high-pressure gas of the housing 2.

After the compressor 1 is operated, and after the pressure difference between the housing 2 and the liquid reservoir 45 exceeds a predetermined design value, the bypass hole 33 is closed, the pressure rise of the housing 2 is accelerated, and the pressure decrease of the liquid reservoir 45 is accelerated.

At this time, since the pressure of the housing 2 rises, the carrier of the second check valve device 53 reduces due to the pressure of the liquid reservoir 45, and the first check valve device 54 opens. Meanwhile, the electric expansion valve 51 optimizes the opening degree thereof according to the temperatures of the evaporator 52 and the condenser 50, and the refrigeration cycle device transitions to stable operation.

Figure 20:
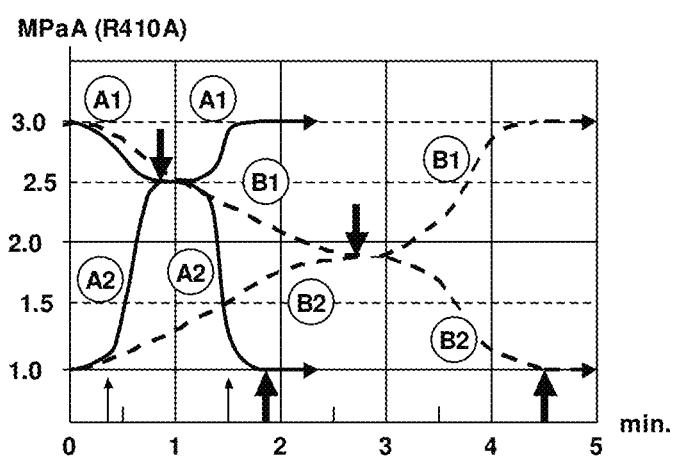
FIG. 20 is a schematic view showing exhaust change of the housing and pressure change of an inside of the liquid reservoir in a process of the compressor in stable operation from starting to stop to completing restarting.

With the refrigeration cycle device of FIG. 20 as the above-described domestic air conditioner, from beginning of the stop of the compressor 1 in stable operation to completion of the restart, the exhaust change of the housing 2 is depicted by a solid line (A1), and the pressure change inside the liquid reservoir 45 is depicted by a solid line (A2). For comparison with the compressor 1, pressure change of the housing of the conventional compressor is shown by a dotted line (B1), and the pressure change of the liquid reservoir is shown by a dotted line (B2).

The horizontal axis is the processing time, numerically expressing minutes (min); the vertical axis represents the pressure (MPaA). The time from beginning of the stop of the compressor to the restart is set as 10 seconds, to confirm whether the above-described two pressures are equal.

The arrow ↓ indicates the time when the high-pressure side pressure and the low-pressure side pressure become equal after the compressor is stopped, and the arrow ↑ indicates the time when the restart is completed after the compressor is restarted until the pressure is equal to the pressure before the operation is stopped.

After the operation of the compressor 1 is stopped, the high pressure (A1) and the low pressure (A2) slowly reduce or rise, respectively, and the bypass hole 33 is opened after about 20 seconds according to the arrow ↑. The high pressure (A1) and the low pressure (A2) sharply reduce or rise, respectively, and the pressures become equal after the operation is stopped for about 50 seconds. Its pressure is 2.5 MPaA. Thereafter, after another 10 seconds, the compressor is restarted. After the operation is stopped for 1 minute and 50 seconds, the pressure is the same as the pressure before the compressor 1 is stopped.

After the operation of the conventional compressor is stopped, the high pressure (B1) and the low pressure (B2) slowly reduce or rise, respectively. But then the reduction and rising of air pressure become slow, and equivalent after about 2 minutes and 40 seconds. The pressure at this time is about 1.9 MPaA. After 10 seconds, the compressor is restarted. After the operation is stopped for about 4 minutes and 30 seconds, the pressure is equivalent to the pressure before the operation is stopped. As a result, the time from stopping the operation to completion of the restart of the compressor 1 is 40% of that of the conventional compressor.

There are two reasons why the time difference is formed.
(1) After the compressor 1 stops operating, pressure exchange is performed between the housing 2 and the liquid reservoir 45, and the time for the pressures to become equal is accelerated. In addition, the equilibrium pressure is high as 2.5 MPaA, so it takes a short time to return to the pressure before the stop starts.

(2) In the operation of the conventional compressor, the compressor housing and the condenser belong to high-pressure containers, and the evaporator and the liquid reservoir belong to low-pressure containers. After the compressor is stopped, the high-pressure refrigerant (containing liquid refrigerant) of the high-pressure container flows out to the evaporator through the expansion valve (or the capillary pipe), so these containers achieve pressure equalizing. Therefore, it takes a long time to achieve pressure equalizing. Besides, the equilibrium force thereof is medium pressure as 1.9 MPaA, so it takes a long time to return to the pressure before the stop starts. The above is the time difference of starting the compressors.

Referring to FIGS. 14-15, and 18-19, a rotary compressor 1 according to an embodiment of the present application may include: a housing 2, a motor 6, a compression mechanism 5, an exhaust pipe 3, a suction pipe 13, a pressure equalizing device 30, and a liquid reservoir 45. The housing 2 can be hermetic, the motor 6 is provided in the housing 2, the compression mechanism 5 is provided in the housing 2 and driven by the motor 6, the exhaust pipe 3 and the inside of the housing 2 are communicated, the suction pipe 13 is coupled to the compression mechanism 5, and the pressure equalizing device 30 has a bypass hole 33 communicating the inside of the housing 2 with the suction pipe 13 to selectively communicate the inside of the housing 2 with the suction pipe 13. A first end of the liquid reservoir 45 is coupled to the suction pipe 13, and a second end of the liquid reservoir 45 is provided with a first check valve device 54.

When the motor 6 is stopped, the pressure of the housing 2 is reduced, the pressure of the liquid reservoir 45 rises, the first check valve device 54 is closed, and the bypass hole 33 of the pressure equalizing device 30 is opened such that the inside of the housing 2 is communicated with the liquid reservoir 45 through the suction pipe 13 until the internal pressure of the housing 2 is equal to that of the liquid reservoir 45. The pressure equalizing device 30 and the first check valve device 54 automatically control the opening and closing by using pressure difference. The cost is low, the reliability is high, power control is not needed, and energy is saved.

The first check valve device 54 prevents the gas of the liquid reservoir 45 from reversely flowing into an evaporator 52. Alternatively, the first check valve device 54 is a one-way valve or an electromagnetic on-off valve to ensure that the gas within the evaporator 52 can enter the liquid reservoir 45 through the first check valve device 54 while the high-pressure gas of the liquid reservoir 45 cannot reversely flow into the evaporator 52.

Further, as illustrated in FIGS. 15 and 18-19, the exhaust pipe 3 is provided with a second check valve device 53, which is closed when the internal pressure of the housing 2 is reduced. When the motor 6 is stopped, the second check valve device 53 prevents the high-pressure gas of the condenser 50 from flowing into the exhaust pipe 3, thereby ensuring that the high-pressure gas in the housing 2 can enter the compression chamber 11 as soon as possible, and further ensuring that the pressure in the housing 2 can be reduced as soon as possible to be equal to the pressure in the compression chamber 11, to shorten the restarting time of the compressor.

Alternatively, the second check valve device 53 is a one-way valve or an electromagnetic on-off valve to ensure that the gas in the exhaust pipe 3 can enter the condenser 50 through the second check valve device 53 while the high-pressure gas of the condenser 50 cannot reversely flow into the exhaust pipe 3.

The compression mechanism 5 includes: a cylinder 10, a main bearing 20, and an auxiliary bearing 25. The main bearing 20 is located at a first end of the cylinder 10, the auxiliary bearing 25 is located at a second end of the cylinder 10, a compression chamber 11 is defined in the cylinder 10, and the suction pipe 13 is communicated with the compression chamber 11. When the compressor normally operates, a refrigerant of the liquid reservoir 45 can enter the compression chamber 11 through the suction pipe 13. After being compressed into high-pressure gas in the compression chamber 11, the refrigerant is discharged into the housing 2. When the compressor is stopped, the high-pressure gas in the housing 2 can enter the compression chamber 11 through the bypass hole 33 and then enter the liquid reservoir 45 through the suction pipe 13 such that the pressure in the housing 2 reduces as soon as possible to be equal to that in the liquid reservoir 45.

As illustrated in FIG. 15, a muffler 23 is provided on a main shaft plate 21 of the main bearing 20, the high-pressure side open end of the pressure equalizing device 30 is provided in the muffler 23, and the muffler 23 has a muffler exhaust hole communicated with the cavity inside the housing 2 (i.e., the space below the motor 6).

As illustrated in FIG. 17, the pressure equalizing device 30 may include: a bypass valve 32, and a spring 34. The bypass valve 32 selectively communicates the high-pressure side open end with the bypass hole 33 using the pressure difference between the housing 2 and the liquid reservoir 45. In other words, the bypass valve 32 is used for opening or closing the bypass hole 33. When the bypass valve 32 opens the bypass hole 33, high-pressure gas in the housing 2 can enter the suction pipe 13 through the bypass hole 33. For example, the high-pressure gas in the housing 2 can pass through the muffler exhaust hole, the high-pressure side open end of the bypass hole 33, and the bypass hole 33 to enter the suction pipe 13 and then enters the liquid reservoir 45 from the suction pipe 13.

The spring 34 expands and contracts by the pressure difference between the housing 2 and the liquid reservoir 45, and the spring 34 moves the bypass valve 32 in the direction of opening the bypass hole 33. In the embodiment illustrated in FIG. 17, the spring 34 is a compression spring, located below the bypass valve 32, always exerting an upward thrust on the bypass valve 32. In some unillustrated embodiments, the spring 34 may also be located above the bypass valve 32, always exerting an upward pulling force on the bypass valve 32. A limiter 35 serves to limit the maximum moving distance of the bypass valve 32 and prevent the bypass valve 32 from falling off.

In the embodiment illustrated in FIGS. 15 and 17-18, the pressure equalizing device 30 may be located on the main shaft plate 21 of the main bearing 20. Certainly, in some unillustrated embodiments, the pressure equalizing device 30 may also be located on the auxiliary shaft plate of the auxiliary bearing 25. Or, each of the main shaft plate 21 and the auxiliary shaft plate is provided with the pressure equalizing device 30.

When the rotary compressor 1 is stopped, the high-pressure gas of the housing 2 leaks from the low-pressure compression chamber 11 to the suction pipe 13 via sliding surfaces of a rolling piston 15 and a sliding vane 16 and the like, and then diffuses to the liquid reservoir 45. After the pressure difference between the housing 2 and the suction pipe 13 becomes smaller, the bypass hole 33 of the pressure equalizing device 30 is opened, the pressures of the housing 2 and the liquid reservoir 45 rapidly become equal, and the first check valve device 54 and the second check valve device 53 are closed midway. Therefore, the compressor 1 can be restarted in a short time, and the pressure of the housing 2 can rapidly return to a high-pressure state before the compressor stops. During pressure rise of the housing 2, the pressure equalizing device 30, the first check valve device 54, and the second check valve device 53 are all opened.

The rotary compressor 1 according to embodiments illustrated in FIGS. 14-20 of the present application has the beneficial effects as follows.

1) The restarting time can be greatly shortened in the air conditioner for controlling the temperature of an air conditioner, and the fluctuation of the temperature of the air conditioner can be greatly improved. In addition, the defrosting operation time can be shortened.

2) The necessary operation time becomes accurate, and the APF (annual performance factor) can be improved by greatly shortening the restarting time of the compressor.

3) The pressure equalizing device 30, the first check valve device 54, the second check valve device 53, and the like are automatically controlled by using the pressure difference, the cost is low, the reliability is high, power control is not needed, and energy conservation is facilitated.

4) A frequency converter motor that runs at a constant speed or at a variable speed can be utilized.

5) It can also be applied to a rotary compressor, a scroll compressor, and like rotary compressors, a double-cylinder compressor, and a horizontal compressor.

A refrigeration cycle device according to an embodiment of another aspect of the present application includes a condenser 50, an expansion device 51 (i.e., an electric expansion valve 51), an evaporator 52, and a rotary compressor of the above embodiments.

In the illustration of the description, the description of reference terms of "one embodiment", "some embodiments", "example", "specific example", or "some examples", etc., means that a specific feature, structure, material, or feature described in connection with the embodiment or example is included in at least one embodiment or example of the present application. In the present description, schematic representations of the above terms are not necessarily directed to the same embodiments or examples. Furthermore, the specific feature, structure, material, or characteristic described may be combined in any one or more embodiments or examples in a suitable mode. In addition, those skilled in the art can join and combine different embodiments or examples described in the description.

While embodiments of the present application have been shown and described above, it is to be understood that the above-described embodiments are illustrative and should not be construed as limiting the present application. Those of ordinary skill in the art can make changes, modifications, substitutions, and variations to the above-described embodiments within the scope of the present application.

What is claimed is:

1. A rotary compressor comprising:
    a housing configured to accommodate a motor and a compression mechanism therein;
    an exhaust pipe communicated with a high-pressure side of a refrigeration cycle device and coupled to the housing;
    a suction pipe coupled to the compression mechanism; and
    a liquid reservoir having a first end coupled to the suction pipe and a second end coupled to a first check valve device,
    wherein the compression mechanism comprises a pressure equalizer having a bypass hole communicating an inside of the housing with the suction pipe,
    wherein, when the motor is stopped, the bypass hole of the pressure equalizer is opened, the first check valve device is closed, and gas in the housing flows into the suction pipe or the liquid reservoir.

2. The rotary compressor according to claim 1, wherein the pressure equalizer comprises:
    a bypass valve configured to open and close the bypass hole in response to a pressure difference between the housing and the suction pipe; and
    a spring configured to enable the bypass valve to move in a direction of opening the bypass hole.

3. The rotary compressor according to claim 2, wherein:
    the compression mechanism comprises an exhaust muffling chamber; and
    a side of the bypass hole is coupled to an inside of the exhaust muffling chamber of the compression mechanism, and the other side of the bypass hole is coupled to the suction pipe or the liquid reservoir.

4. The rotary compressor according to claim 1, wherein one of a main shaft plate and an auxiliary shaft plate coupled to two open side surfaces of a cylinder compression chamber in the compression mechanism is equipped with the pressure equalizer.

5. The rotary compressor according to claim 1, further comprising a check valve provided between the high-pressure side of the refrigeration cycle device and the exhaust pipe, wherein the check valve is configured to prevent high-pressure gas on the high-pressure side of the refrigeration cycle device from reversely flowing into the exhaust pipe when the motor is stopped.

6. The rotary compressor according to claim 2, wherein:
    when the pressure difference between the housing and the suction pipe is less than a preset value, the bypass valve is configured to open the bypass hole; and
    when the pressure difference between the housing and the suction pipe is larger than the preset value, the bypass valve is configured to close the bypass hole.

7. The rotary compressor according to claim 1, wherein:
    the compression mechanism comprises a cylinder, a main bearing, and an auxiliary bearing; and
    the main bearing is located at a first end of the cylinder, the auxiliary bearing is located at a second end of the cylinder, and each of a main shaft plate of the main bearing and an auxiliary shaft plate of the auxiliary bearing is provided with the pressure equalizer.

8. The rotary compressor according to claim 7, wherein:
    a side of the main bearing facing away from the cylinder is provided with a main muffler,
    a side of the auxiliary bearing facing away from the cylinder is provided with an auxiliary muffler,
    the compression mechanism has a through-hole communicated with the main muffler and the auxiliary muffler, and
    a first end of the bypass hole of the pressure equalizer is communicated with a muffling chamber of a corresponding muffler, and a second end of the bypass hole is communicated with the suction pipe.

9. The rotary compressor according to claim 1, wherein:
the compression mechanism comprises a cylinder, a main bearing, and an auxiliary bearing; and
the main bearing is located at a first end of the cylinder, the auxiliary bearing is located at a second end of the cylinder, and the pressure equalizer is provided on an outer circumferential surface of the cylinder.

10. The rotary compressor according to claim 1, wherein the first check valve device comprises a one-way valve or an electromagnetic on-off valve.

11. The rotary compressor according to claim 1, wherein the exhaust pipe is provided with a second check valve device, and the second check valve device is closed when an internal pressure of the housing is reduced.

12. The rotary compressor according to claim 1, wherein the second check valve device comprises a one-way valve or an electromagnetic on-off valve.

13. The rotary compressor according to claim 1, wherein the pressure equalizer comprises:
a bypass valve configured to open or close the bypass hole; and
a spring configured to expand and contract by a pressure difference between the housing and the liquid reservoir.

14. The rotary compressor according to claim 13, wherein a high-pressure side open end of the bypass hole is located in a muffler of the compression mechanism.

15. The rotary compressor according to claim 14, wherein:
the compression mechanism comprises a cylinder, a main bearing, and an auxiliary bearing; and
the main bearing is located at a first end of the cylinder, the auxiliary bearing is located at a second end of the cylinder, the cylinder defines a compression chamber, and the suction pipe is communicated with the compression chamber.

16. The rotary compressor according to claim 14, wherein the muffler has a muffler exhaust hole communicated with the inside of the housing.

17. The rotary compressor according to claim 13, wherein the bypass valve is configured to selectively communicate the bypass hole with the suction pipe by the pressure difference between the housing and the liquid reservoir, and the spring is configured to move the bypass valve in a direction of opening the bypass hole.

18. A refrigeration cycle device, comprising a rotary compressor according to claim 1.

* * * * *